（12）United States Patent
Vollmer et al.

(10) Patent No.: US 8,620,520 B2
(45) Date of Patent: Dec. 31, 2013

(54) METHOD FOR CONTROLLING DEVICES, AND A DEVICE IN A COMMUNICATIONS NETWORK IN A MOTOR VEHICLE

(75) Inventors: Vasco Vollmer, Lechstedt (DE); Wolfgang Baierl, Remshalden (DE)

(73) Assignee: Robert Bosch GmbH, Stuttgart (DE)

( * ) Notice: Subject to any disclaimer, the term of this patent is extended or adjusted under 35 U.S.C. 154(b) by 545 days.

(21) Appl. No.: 12/436,463

(22) Filed: May 6, 2009

(65) Prior Publication Data

US 2009/0259364 A1 Oct. 15, 2009

Related U.S. Application Data

(63) Continuation-in-part of application No. 10/275,831, filed as application No. PCT/DE01/00990 on Mar. 15, 2001, now abandoned.

(30) Foreign Application Priority Data

May 9, 2000 (DE) .................................. 100 22 423

(51) Int. Cl.
*G06F 19/00* (2011.01)
*G06F 3/00* (2006.01)

(52) U.S. Cl.
USPC ............. 701/36; 709/228; 709/230; 709/238; 719/318; 719/319; 719/320; 719/321

(58) Field of Classification Search
USPC ............ 701/36; 709/227, 217, 221, 228, 230, 709/238; 719/327, 318, 319, 320, 321; 713/100; 710/9, 8, 10
See application file for complete search history.

(56) References Cited

U.S. PATENT DOCUMENTS

| 5,546,273 | A | 8/1996 | Harris |
| 5,812,951 | A | 9/1998 | Ganesan et al. |
| 6,529,949 | B1 * | 3/2003 | Getsin et al. ................... 709/217 |
| 6,556,937 | B1 | 4/2003 | Byers |
| 6,769,130 | B1 * | 7/2004 | Getsin et al. ..................... 725/89 |
| 7,188,193 | B1 * | 3/2007 | Getsin et al. ................... 709/248 |
| 2002/0083228 | A1 * | 6/2002 | Chiloyan et al. .................. 710/9 |
| 2002/0095501 | A1 * | 7/2002 | Chiloyan et al. .............. 709/227 |
| 2004/0039949 | A1 * | 2/2004 | Vollmer et al. ................ 713/300 |
| 2004/0205284 | A1 | 10/2004 | Kinstler |
| 2004/0220926 | A1 * | 11/2004 | Lamkin et al. ..................... 707/3 |

FOREIGN PATENT DOCUMENTS

DE 197 09 800 9/1998
(Continued)

*Primary Examiner* — Ronnie Mancho
(74) *Attorney, Agent, or Firm* — Michael J. Striker

(57) ABSTRACT

A method for managing a plurality of devices interconnected as a communications network in a motor vehicle via one or a plurality of interconnected bus systems is presented, the method including recognizing and generating a device specific control component for newly attached devices. The method includes operating a generic control module to operate upon data stored in a newly attached device to generate the device-specific control component, which is used to control the device. The device-specific control component either can be added to the generic control module or can be stored independently of the generic control module in the respective device. The generic control module is used in a gateway or a system manager of the communications network. A human-machine interface adapts to the device-specific control component. The network is interconnected by a bus system, preferably embodied according to IEEE 1394.

20 Claims, 3 Drawing Sheets

(56) References Cited

FOREIGN PATENT DOCUMENTS

| | | |
|---|---|---|
| EP | 0 513 443 | 11/1992 |
| EP | 0 874 343 | 10/1998 |
| WO | 99/31814 | 6/1999 |
| WO | 99/56201 | 11/1999 |
| WO | 00/13344 | 3/2000 |

* cited by examiner

METHOD FOR CONTROLLING DEVICES, AND A DEVICE IN A COMMUNICATIONS NETWORK IN A MOTOR VEHICLE

CONTINUATION-IN-PART APPLICATION

This is a Continuation-in-Part Application of application Ser. No. 10/275,831, filed on Jun. 12, 2003.

BACKGROUND OF THE INVENTION

The invention provides a method for controlling devices within a communications network, and a system for controlling a communications network in a motor vehicle that implements the method.

The use of communications networks in motor vehicles is already known. These communications networks serve to connect controllable devices and sensors. The controllable devices in particular include infotainment devices, such as a car radio, navigation devices, and audio media player devices, without limitation.

One technology proposed for communications networks in motor vehicles is a serial bus system for operation in accordance with the IEEE 1394 standard. For such serial bus system operation, terminal devices are connected to one another by means of a 4 to 6-wire cable or by means of an optical waveguide. End pieces contained in the bus are referred to as leaves, relay nodes are referred to as branches, and the uppermost node is finally referred to as a root. This bus system is self-configuring, i.e., all nodes in the bus system send data via themselves to the other nodes. The bus management can be transferred to one or more nodes. When there are several nodes that are provided for the bus management, a competition is occurs and the winner of this competition takes over the bus management. An operating software runs on the individual nodes, which communicate with and cooperate with each other to operate the bus-attached devices as a communications network.

SUMMARY OF THE INVENTION

The present invention overcomes the shortcomings of the prior art providing a method for managing a communications network that includes self-configuring devices that attach to one or more system buses that maintain the network's interconnectedness, and a system that implements the method.

The novel system and method control the network devices, and any additional device attaching to the motor vehicle communications network using a generic control software module that if needed, generates a device-specific control component for the newly detected/added network devices. To do so, the generic control module processes data stored in the newly attached device are taken into account, thus permitting a control and active integration of the new device into the communications network. The stored data include the functions connected with this device, parameters required for operation, permissible value ranges, the required resolution, and the chronological sequences in the processing of commands. As a result, the operation of the newly added device is defined at a minimal memory cost and the smallest possible data base; these data are used to generate the device-specific control component.

This process is achieved without having to produce a run time environment. This results in reduced costs. The device-specific control component or software generated by the generic control module is thereafter available, or can be distributed as needed to different devices of the communications network in order to assure the function of the newly attached device. Such method and system are particularly suited for connection of the new devices via a radio interface or an infrared interface, since new devices are frequently connected to the network, i.e., the network bus using such interfaces.

It is particularly advantageous for the device-specific control component to be used independently of the generic control module, or the managing software application which comprises the generic control module, as depicted in FIG. 4. Other devices may then access and utilize the device-specific control component. To this end, the generic control module and the device-specific control component may be stored independently of each other within the network, so that these component and module are not contained in the same device. For example, the generic control module may reside in a network manager device, gateway device, network bus control device, where the device-specific control component can reside in a memory within a newly added device, i.e., a CD player device. In this connection, the term "device" refers to a component connected to a bus.

Alternatively, the invention provides for adding the device-specific control component to the generic control module, enabling the generic control module to control the new device. A prerequisite for this is that the generic control module be used to control all of the devices comprising the network. In an alternative embodiment, a generic control module can be contained in different system managers or gateways controlling various bus systems comprising the network, where each generic control module includes and maintains the device-specific control components particular network portion of the gateways and system managers. That is, the generic control component is stored in gateways and carries out an overriding function in the central node in the communications network.

Furthermore, the device-specific control components are available automatically or interactively adapt the human-machine interface in the motor vehicle to the newly added device. As a result, the additional functionality performed by the newly added device advantageously becomes immediately apparent to a user.

The invention is advantageous in its ability to facilitate the communications network as a bus system since in motor vehicles in order to connect various devices to one another and in particular for integrating newly added devices, particularly according to the IEEE 1394 standard since this is a standard for the consumer electronics industry. It is also advantageous that a device, preferably a gateway device, include an operating system with the generic control module, so that the gateway device is able to use the communications network to call up the data from the other devices connected to the communications network and uses these data to generate the device-specific control component, which can then be used to control the respective additional device.

In one embodiment, a method for managing a plurality of devices interconnected as a communications network in a motor vehicle via one or a plurality of interconnected bus systems is provided. The method comprising providing a network management software application in a memory allocated on one of the plurality of network devices, wherein the software application further includes a generic control module, operating the network management software application to detect at least one device connected to the one or plurality of interconnected bus systems, operating the generic control module to access and process data stored in at least one additional device to generate a device-specific control component for controlling the at least one additional device within the network, and determining whether said controlling is to be carried out only by the generic control module and if the controlling is not limited to being carried out only by the generic control module, storing the generated device-specific control component in a memory within the at least one additional device, and allowing other of the plurality of devices interconnected as the communications network access to memory-stored device-specific control component in order to control the at least one additional device without interaction with the generic control module.

The method further includes adding the generated device-specific control component to the generic control module. The generic control module accesses any device, processes the data stored therein to generate a device-specific control component for said device, and stores same device-specific control component with other device-specific control components in a memory accessible by said generic control module. The device-specific control component is used independently of the generic control module. However, if the step of operating determines that a device-specific control component exists for the at least one additional device, overwriting the pre-existing with the generated device-specific control component.

The method includes that the communications device comprise at least one gateway device, where the generic control module is memory stored and used in said at least one gateway device. For that matter, the communications network preferably includes a human-machine interface device in the motor vehicle, which adapts to the generated device-specific control component generated for the at least one additional device. The one network device comprising the network management software application and generic control module preferably comprises a bus controller that controls the one or plurality of interconnected bus systems to operate and manage the communications network. The bus controller and the one or plurality of interconnected bus systems operate and manage the communications network in accordance with an IEEE 1394 bus system standard, and the data stored in at least one additional device includes functions written in an automatically processable language, the functions called or executed by at least one command to control the at least one additional device and parameters, value ranges, resolutions, and chronological relationships associated with intended operation of the at least one additional device.

In another embodiment, the invention includes a system for implementing a communications network in a motor vehicle. The system comprises a plurality of devices including one of the plurality of devices configured as a network management device and at least one system bus interconnecting the plurality of devices. The network management device comprises a network management software application to manage the plurality of devices and the communications network that includes detecting connection to the system bus of at least one additional device. The software application comprises a generic control module that accesses and processes device specific data stored in the at least one additional device to generate a respective device-specific control component for use in controlling the at least one additional device for communications network operation.

The system includes that the device-specific control component for the at least one additional device is added to the generic control module. Preferably, the generic control module comprises a gateway. The network management device comprising the network management software application and generic control module comprise a gateway. The at least one additional device includes memory in which the device-specific data are stored. The device-specific control component generated by the generic control module is stored in said memory, and is accessible by ones of said plurality of network devices. Preferably, the system bus is managed by a bus controller configured to control network operation in accordance with an IEEE 1394 standard. Alternatively, the network management device comprises said bus controller.

In an other embodiment, the invention comprises a computer program product, comprising a tangible storage medium readable by a processing circuit and storing instructions for execution by the processing circuit for performing a method for managing a plurality of devices interconnected as a communications network in a motor vehicle via one or a plurality of interconnected bus systems, as set forth. The computer program device may further include instructions that when executed implemented the further limitations.

BRIEF DESCRIPTION OF THE DRAWINGS

Exemplary embodiments of the invention are depicted in the drawings and will be explained in detail in the subsequent description.

DETAILED DESCRIPTION OF THE INVENTION

In view of the fact that it is increasingly common for motor vehicles to have communications networks for connecting a wide range of devices to one another, such as car radios, playback devices of sound carriers, navigation devices, and locating devices, it is not only desirable but necessary to make it easy to install newly added devices. One of the advantages of the invention is the self-configurability of the communications network and its devices.

The method and system provide for a communications network with a generic control module that uses data stored in attached networks devices to automatically generate device-specific control components that enable the network, and other network devices to control these devices. That is, once the device-specific control components are generated for an attached device, it is possible to use the control components for other network applications that make use of such device-specific control components. The applications are either other physical devices that are physically or wirelessly attached to the network, or software modules or scripts that run on the device to be controlled.

The method and system may distribute the device-specific control components over the individual devices, system managers, or gateways to achieve a respectively suitable network configuration. Alternatively, the device-specific control component can be added to the generic control module, which then controls the individual devices, system managers, or gateways. Such controlling can be snared and exclusive. The data stored in the devices that are processed by the generic control module precisely defines the possible functions, which can be performed by the device, and indicates parameters, value ranges, resolutions, and chronological sequences required for said device operation. These data are therefore particularly used to generate device-specific control components.

Figure 1:
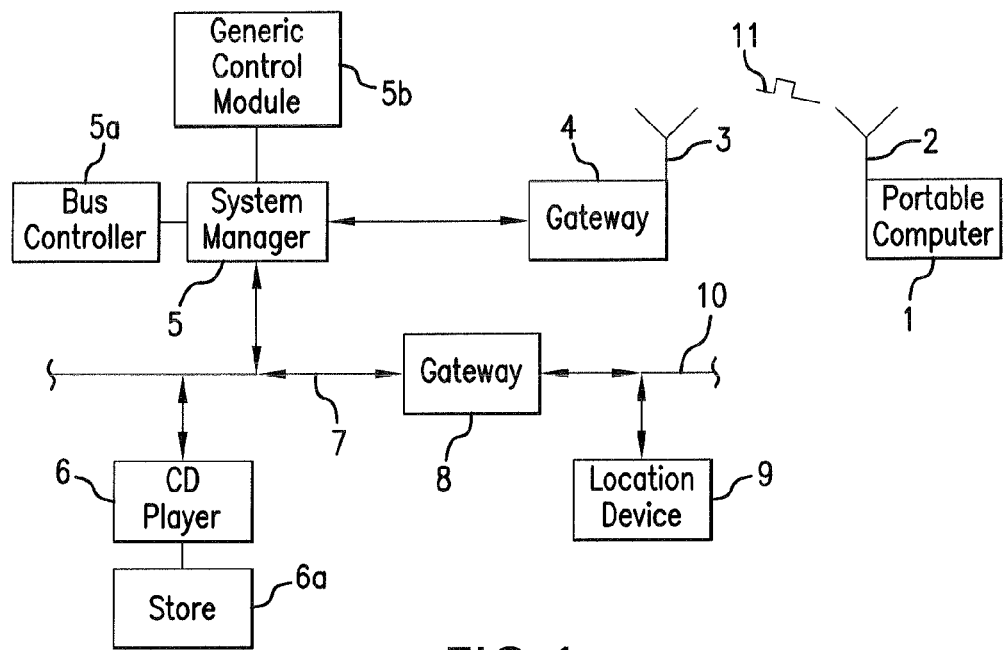
FIG. 1 is a schematic level diagram depicting the structure of a communications network operating in accordance with the present invention.

FIG. 1 shows one possible configuration of a communications network in a motor vehicle in which the inventive method is implemented. The FIG. 1 communications network includes three different network technologies: a radio connection 11, a bus 7, and an additional bus 10. Gateway devices 4, 8 represent interfaces between these different communications network technologies. In particular, gateway devices 4, 8 prevent an unauthorized access to a communications network.

Radio connection 11 connects a portable computer device 1 having an attached antenna 2 to gateway device 4 via an antenna 3 included in the gateway device. Alternatively, it is also possible to provide an infrared free space transmission here. In this case, the portable computer device 1 has an infrared transmitter and receiver, and gateway device 4 also includes and infrared transmitter and receiver. Alternatives for the portable computer device include a mobile telephone device, a personal digital assistant device, or a device in another communications network, without limitation.

Gateway device 4 is further connected via a data input/output and a line to a first data input/output of a system manager device 5. System manager device 5 controls the devices connected to the bus systems 7 and 10. The system manager device 5 can be alternatively implemented with the gateway device 4 or on some other computer device in the motor vehicle. System manager device 5 is connected to the bus 7 via a second data input/output. The bus system 7 is connected to a CD player device 6 via a data input/output. The bus 7 is connected to a data input/output of the gateway device 8. The gateway device 8 is connected to the bus 10 via a data input/output. The bus 10 is connected to a location device 9 via a data input/output.

Alternatively, it is possible to connect other component devices such as navigation devices, car radios devices, or minidisk player devices, without limitation, to the bus systems 7 and 10. The gateway devices 4, 8 operate to assure that a controlled and authorized access that is possible in one network technology is also possible in the other network technology. These gateway devices 4, 8 prevent unauthorized network accesses. A device connected to the bus systems 7, 10 has a bus controller 5a, for example, the system manager device 5, which controls the data communication via the respective bus system. The system manager maintains a memory or database 5b to store a generic control module 5b.

Figure 2:
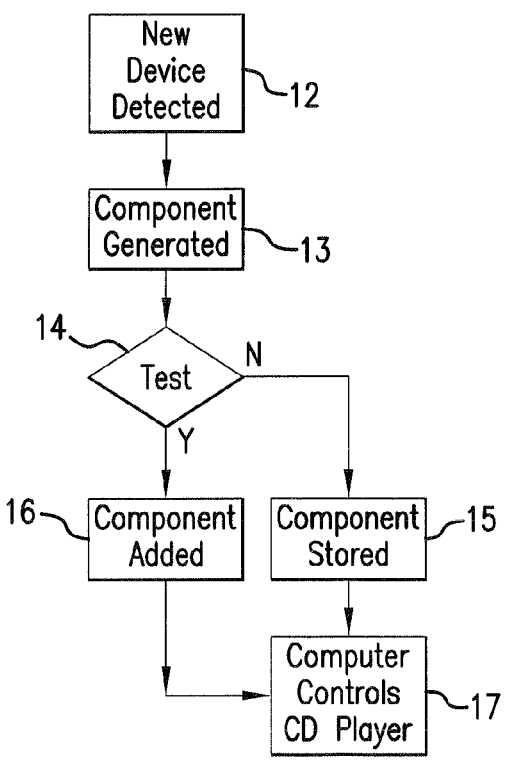
FIG. 2 is a schematic diagram depicting operational flow of one embodiment of a method of the invention.

FIG. 2 presents a flowchart depicting one embodiment of the method for controlling devices in a communications network in a motor vehicle is depicted shown in the form of a flow chart, and its novel operation. That is, when new devices are attached to and recognized by a network such as the network depicted in FIG. 1, the method according to the invention accesses data stored on the newly attached device and processes same to generate a device-specific control component as needed. As already stated, the device-specific control component makes it possible to control the newly added device. To understand the FIG. 2 program flow, it must be assumed that CD player device 6 has just been connected to the bus 7, and being controlled by the portable computer 1 and the system manager 5 before operation of the novel generic control module 5b. That is, since at instant attachment, there is no device-specific control component for the CD player 6, the inventive method must generate the particular device-specific control component for controlling the device.

That is, step 12 indicates a step of detecting that CD player device 6 is now attached/connected to the bus 7. In the instant example, the system manager 5 on which the generic control module is running does the detecting. The newly connected device 6 sends data from store 6a over the bus 7 that identifies CD player device 6 as a new device and logs it onto the communications network. The generic control module 5b is in a position to use data store 6a to generate the device-specific control component for this device.

That is, in step 13, therefore, the generic control module 5b uses data stored in the CD player device 6 to generate the device-specific control component. These stored data include the functions and commands of the CD player 6, which functions can be comprised of a number of commands. Several examples of CD player commands include ejecting the CD, playing the CD, pause, stop, a random playing of different titles, a storing of different titles, and the output of CD text. These functions are thus already stored in the device as are prescribed maintenance schedules and chronological relationships that exist between individual commands of a function. In addition, parameters, value ranges of a resolution, and physical units are stored in the device, by means of which the device-specific control component, i.e. the control component for the CD player device 6, is generated.

The device-specific data are thus stored in a definite structure, for example, in a memory or database 6a included in the CD player device 6. The commands that execute the functions of the device 6 are stored in a standardized, automatically processable language, which is also known as the Function Description Language (FDL). The parameters, value ranges, and the resolution are also stored in FDL. Additional data regarding processing times and chronological relationships between the commands of a function are described in FDL, for example, by means of a flow chart or a timing diagram.

In step 14, a test is made determine whether the device-specific control component has been added to or otherwise present within the generic control module in the system manager 5. If this is not the case, then in step 15, the device-specific control component is stored in the CD player 6, i.e. in store 6a, and can thus be used by various control instances, such as the portable computer device 1. To that end, the portable computer 1 contains a software element that can be used to exert control over the device-specific control component now inserted in store 6a of CD player device 6. The device-specific control component, once generated by the generic control module 5b also can be transferred directly to the portable computer device 1 and then used as a software element. The program flow then passes to step 17, wherein the portable computer device 1 controls the CD player 6.

However, if it is determined in step 14 that the device-specific control component should be added to the generic control module 5b in or attached to the system manager 5, then the device-specific control component is stored in the generic control module 5b in the system manager 5. The system manager 5 will also stored a device-specific control component for the locating device 9, which has already been generated. In this instance, a manufacturer of the locating device 9 has already generated such a device-specific control component in the locating device 9, an instance of which is stored in the generic control module 5b.

The program flow then passes to step 17, wherein CD player device 6 is controlled by means of the system manager 5 and the now expanded generic control module is executed. In this case, a software element that differs from the generic control module is rerecorded for the portable computer device 1 in order to assure that the CD player device 6 can be controlled according to its requirements stored in said data. Such operation facilitates network security needs in that the portable computer device 1 has use of the generic control module 5b, within which the respective different device-specific control components are stored. That is, by allowing access to the generic control module by the portable computer device 1, the portable computer device 1 is able to control other devices via the device-specific control components. Alternatively, however, this control by a device such as personal computer device 1 may be limited and only permitted on a case-by-case basis.

The method according to the invention also makes it possible to generate a device-specific control component for a device connected to the communications network via a wireless interface. The wireless interface is either embodied as a radio interface or as an infrared interface. With a radio interface, the device to be connected and the gateway, which receives the data from the device and sends data to it, each have a respective send/receive device and an antenna. With an infrared interface, both the device and the gateway have an infrared transmitter and an infrared receiver; the infrared transmitter can be a laser or light-emitting diode, whereas a photodiode is used for the infrared receiver.

In a motor vehicle, a user has at least one human-machine interface for controlling the existing infotainment components. If a new device is added, with the generation of the device-specific control component, the human-machine interface is then automatically broadened by the functions defined for this new device. For the CD player device 6, this means that the functions of the CD player device 6 are readily presented on a display device in the motor vehicle, for example, as a displayed menu, whereby options can be selected by a user using an input device, i.e., known soft keys. Such soft keys are freely programmable so that they can be easily adapted to newly added functions.

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the invention, could be utilized.

Figure 3:
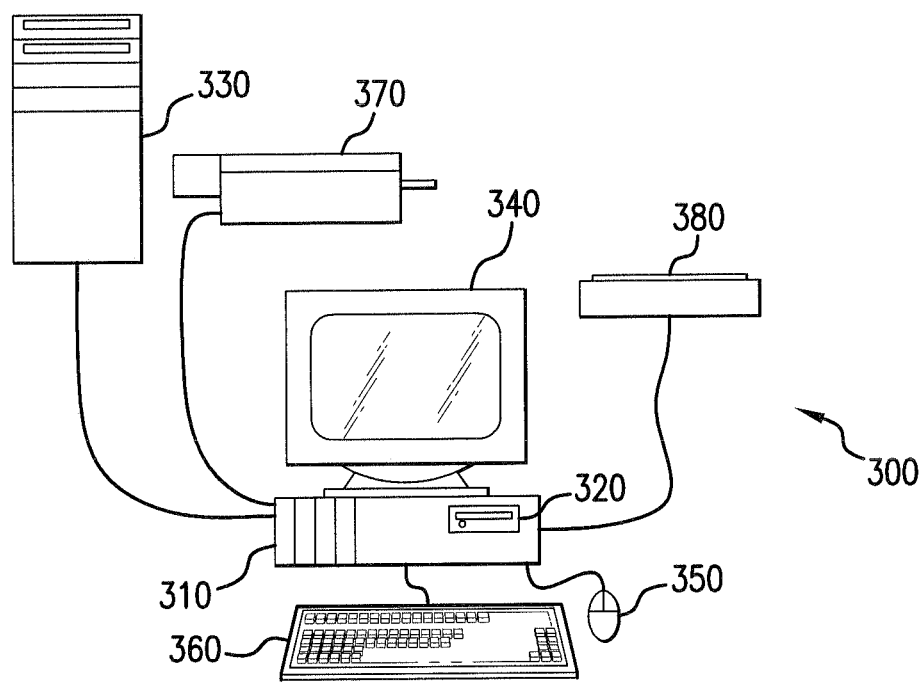
FIG. 3 is a system level diagram depicting a computer system device that can be used for managing a plurality of devices interconnected as a communications network in a motor vehicle via one or a plurality of interconnected bus systems.
Figure 4:
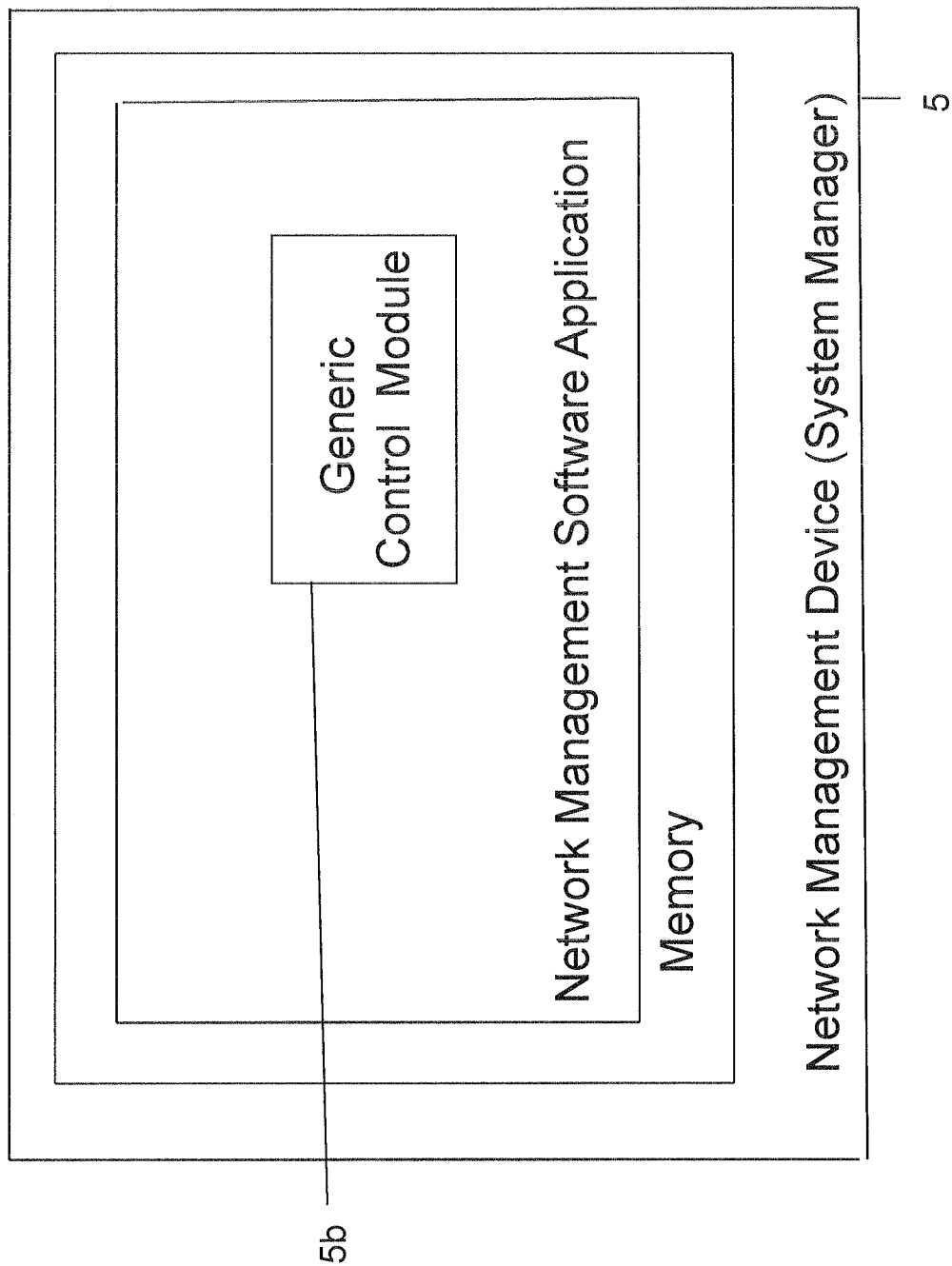
FIG. 4 depicts a memory-stored Network Management Software Application including a generic control module, within a network management device (system manager).

A computer-based system (300) is depicted in FIG. 3 herein, by which the inventive method for managing a plurality of devices interconnected as a communications network in a motor vehicle via one or a plurality of interconnected bus systems, described in detail with respect to FIGS. 1 and 2 may be carried out. The computer-based system (300) includes a processing unit (310), which houses a processor or processing circuit, memory and other systems components (not shown expressly in the drawing figure) that implement a general purpose processing system, or computer that may execute a computer program product. The computer program product may comprise media, for example a compact storage medium such as a compact disc, which may be read by the processing unit (310) through a disc drive (320), or by any means known to the skilled artisan for providing the computer program product to the general purpose processing system for execution thereby.

The computer program product comprises all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit (310), as mentioned, or may be located on a remote system such as a server (330), coupled to processing unit (310), via a network interface such as an Ethernet interface. Monitor (340), mouse (350) and keyboard (360) are coupled to the processing unit (310), to provide user interaction. Scanner (380) and printer (370) are provided for document input and output. Printer (370) is shown coupled to the processing unit (310) via a network connection, but may be coupled directly to the processing unit. Scanner (380) is shown coupled to the processing unit (310) directly, but it should be understood that peripherals might be network coupled, or direct coupled without affecting the ability of the processing unit (310) to perform the method of the invention.

Although examples of the present invention have been shown and described, it would be appreciated by those skilled in the art that changes may be made in these embodiments without departing from the principles and spirit of the invention, the scope of which is defined in the claims and their equivalents. For example, while the program of the present system is illustratively described as a test program, clearly any application program would readily benefit from the present system and as such, the present system should be understood to apply to any application program and pools of application programs.

What is claimed is:

1. A method for managing a plurality of devices interconnected as a communications network in a motor vehicle via one or a plurality of interconnected bus systems, comprising steps of:
   providing a network management software application in a memory allocated on one of the plurality of network devices, wherein the software application further includes a generic control module;
   operating the network management software application to detect at least one device connected to the one or plurality of interconnected bus systems;
   operating the generic control module to access and process data stored in at least one additional device to generate a device-specific control component for controlling the at least one additional device within the network, and determining whether said controlling is to be carried out only by the generic control module; and
   if the controlling is not limited to being carried out only by the generic control module, storing the generated device-specific control component in a memory within the at least one additional device, and allowing other of the plurality of devices interconnected as the communications network access to memory-stored device-specific control component in order to control the at least one additional device without interaction with the generic control module.

2. The method as set forth in claim 1, further including adding the generated device-specific control component to the generic control module.

3. The method as set forth in claim 2, wherein the generic control module accesses any device, processes the data stored therein to generate a device-specific control component for said device, and stores same device-specific control component with other device-specific control components in a memory accessible by said generic control module.

4. The method according to claim 1, wherein the device-specific control component is used independently of the generic control module.

5. The method as set forth in claim 1, wherein if the step of operating determines that a device-specific control component exists for the at least one additional device, overwriting the pre-existing with the generated device-specific control component.

6. The method as set forth in claim 2, wherein the communications network includes at least one gateway device and the generic control module is memory stored and used in said at least one gateway device.

7. The method as set forth in claim 1, wherein the communications network includes a human-machine interface device in the motor vehicle, which adapts to the generated device-specific control component generated for the at least one additional device.

8. The method as set forth in claim 1, wherein the one network device comprising the network management software application and generic control module comprises a bus controller that controls the one or plurality of interconnected bus systems to operate and manage the communications network.

9. The method as set forth in claim 8, wherein the bus controller and the one or plurality of interconnected bus systems operate and manage the communications network in accordance with an IEEE 1394 bus system standard.

10. The method as set forth in claim 1, wherein said data stored in at least one additional device includes functions written in an automatically processable language, the functions called or executed by at least one command to control the at least one additional device and parameters, value ranges, resolutions, and chronological relationships associated with intended operation of the at least one additional device.

11. A system for implementing a communications network in a motor vehicle, comprising:
a plurality of devices including one of the plurality of devices configured as a network management device; and
at least one system bus interconnecting the plurality of devices;
wherein the network management device comprises a network management software application to manage the plurality of devices and the communications network that includes detecting connection to the system bus of at least one additional device, and wherein the software application comprises a generic control module that accesses and processes device specific data stored in the at least one additional device to generate a respective device-specific control component for use in controlling the at least one additional device for communications network operation.

12. The system as set forth in claim 11, wherein the device-specific control component for the at least one additional device is added to the generic control module.

13. The system as set forth in claim 12, wherein the generic control module comprises a gateway.

14. The system as set forth in claim 12, wherein the network management device comprising the network management software application and generic control module comprise a gateway.

15. The system as set forth in claim 11, wherein the at least one additional device includes memory in which the device-specific data are stored.

16. The system as set forth in claim 15, wherein the device-specific control component generated by the generic control module is stored in said memory.

17. The system as set forth in claim 16, wherein the device-specific control component is accessible by ones of said plurality of network devices.

18. The system as set forth in claim 11, wherein the system bus is managed by a bus controller configured to control network operation in accordance with an IEEE 1394 standard.

19. The system as set forth in claim 17, wherein the network management device comprises said bus controller.

20. A computer program product, comprising:
a tangible storage medium readable by a processing circuit and storing instructions for execution by the processing circuit for performing a method for managing a plurality of devices interconnected as a communications network in a motor vehicle via one or a plurality of interconnected bus systems, the method comprising steps of:
providing a network management software application in a memory allocated on one of the plurality of network devices, wherein the software application further includes a generic control module;
operating the network management software application to detect at least one device connected to the one or plurality of interconnected bus systems;
operating the generic control module to access and process data stored in at least one additional device to generate a device-specific control component for controlling the at least one additional device within the network, and determining whether said controlling is to be carried out only by the generic control module; and
if the controlling is not limited to being carried out only by the generic control module, storing the generated device-specific control component in a memory within the at least one additional device, and allowing other of the plurality of devices interconnected as the communications network access to memory-stored device-specific control component in order to control the at least one additional device without interaction with the generic control module.

* * * * *